June 11, 1935.  A. B. SMEDLEY  2,004,589
ELECTRICAL CONDUCTOR
Filed May 25, 1932
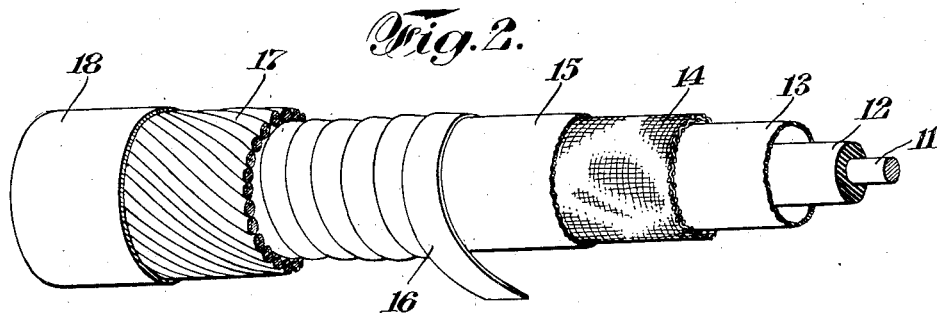
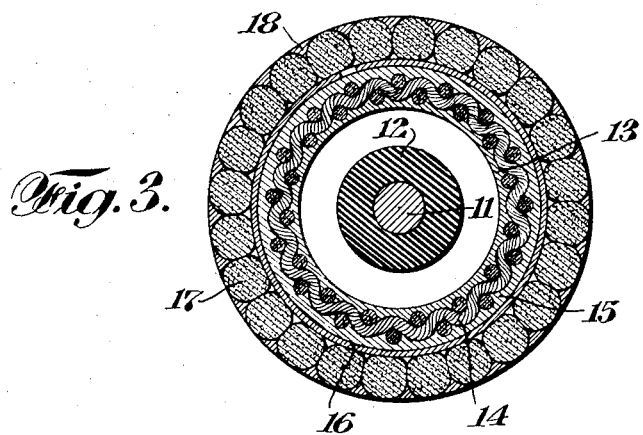
INVENTOR
ANDERSON B. SMEDLEY
BY
Usina + Rauber
ATTORNEYS Patented June 11, 1935

2,004,589

UNITED STATES PATENT OFFICE 2,004,589

ELECTRICAL CONDUCTOR

Anderson B. Smedley, Flushing, N. Y., assignor to Anaconda Wire & Cable Company, New York, N. Y., a corporation of Delaware Application May 25, 1932, Serial No. 613,347

13 Claims.  (Cl. 247—3)

My invention aims to provide a combination duct and cable. The duct is stiff enough to resist collapsing under external pressures that may be encountered in use and, at the same time, is flexible enough to permit its installation in curved lines. It is distinguished from ordinary ducts in that it is combined with the cable in a unitary article of manufacture and sale; and being distinguished from the usual armor or protective sheathing of underground installations in that it is separate from the cable.

The accompanying drawing illustrates an embodiment of the invention.

Fig. 1 illustrates a coil of the completed combination in the form in which it is sold.

Fig. 2 is a perspective showing the successive layers of material.

Fig. 3 is a cross section of the completed article.

Referring to Fig. 1, the combination duct and cable is made in practically unlimited lengths and cut into suitable lengths for transportation and installation and sold in any convenient form such as the coil of Fig. 1.

The conductor 11 is a copper wire or a stranded conductor surrounded by a coating of insulation 12 of rubber. This insulation may be of various other materials well known in the trade for the purpose, and may be supplemented by further layers of tape or other fabric.

Loosely surrounding the insulated conductor is the duct. This also may be made in various ways and of various materials to secure the desired qualities. As illustrated, it has an inner lining 13 in the form of sheet latex surrounded by a woven tube 14 of cotton or the like impregnated with asphalt. This in turn is enclosed within a tube 15 of sheet latex surrounded by a spirally wound tape 16 of paper, plain or impregnated with asphalt or the like, varnished cambric, rubberized cloth, cellophane or the like.

Surrounding the tube 16 is a serving of cord-like material to give the desired strength. As illustrated this serving 17 is of paper twine treated with asphalt. A coating 18 is applied to the serving and is composed of stearine pitch, mica or similar powdered material. Or this may be a coating of asphalt or similar coal tar product.

The conductor itself is insulated and may be in either a finished or unfinished state with respect to waterproofing and similar protection. The duct is larger than the cable, and the latter may be pulled out after installation and may be replaced. But preferably the insulated conductor is passed up through the loom and encased loosely in the duct in the process of manufacturing the latter.

Primarily the combination is not intended to be used like ordinary separate wiring conduit where the conduit is first installed and the wire afterwards pulled through it; though the conduit and the duct may be shipped separately and combined before laying them in the earth.

The invention is also intended primarily, though not necessarily exclusively, for comparatively small conductors. Thus when laid in the earth, the duct will be strong enough and of sufficiently small diameter to support itself against the earth pressure.

I have produced the invention, for example, with an outside diameter of about 1½ inches and the other dimensions proportionately, as indicated in the accompanying drawing.

The special advantages of the invention are found in its installation under ground such, for example, as for street lighting service. In this service it has heretofore been the practice to lay the conduit separately and then later draw the wire through it.

The invention has advantages over what is called the parkway type in which some form of conduit is built directly on to the cable and adheres closely to it so that the conductor cannot be withdrawn after installation.

The present invention combines two advantages namely, ability to withdraw the conductor after installation, and ability to install the duct and cable in one operation.

The invention is not intended for house wiring where it would have to be in vertical sections, where it would be difficult, if not impossible, to install the conductor and the duct at the same time.

In installing the cable of this invention under ground, the conductor and conduit are fastened together only at the ends after installation, for instance as in the base of a street lamp, to prevent the entrance of dirt and moisture in the end of the conduit at the point where the conductor is brought out and spliced to the transformer or lamp lead.

The special construction of the duct facilitates this operation. The duct must be stiff enough to resist collapsing under the external pressure of the earth and yet must be flexible enough to be curved, and must be waterproof.

After installation, if for any reason the need for the conductor has passed and it is desired to remove it, the expensive conductor portion can be withdrawn, leaving the inexpensive conduit in place. It may be either wasted or possibly re-used later.

With previous parkway cable, the conductor has been closely wrapped with spiral steel strips and finished with a waterproof jute serving, so that the cable could not be reclaimed without removal of the sod overlying it in parks, or the concrete overlying it where it has run under sidewalks or paved streets.

The usual underground cable is laid in an open ditch of irregular contour at a depth of approximately 18 inches, from which it can be removed only by digging. It is subjected to displacement by frost in many localities and often subjected to pressures from ground loading above. There is generally moisture in the ground from which the cable is usually protected by a lead casing. Since lead is low in elasticity it is generally provided with the mechanical protection of steel armor wires.

There is no case in which such underground cables have been made to permit withdrawal of the conductor without reopening the ditch and lifting it out. The new idea of the present invention is in the removability of the conductor in underground work of this character. The invention permits the use of a plain rubber insulated conductor; in which case the duct alone is depended upon for resistance to penetration of moisture and for the necessary stiffness, though it is flexible enough lengthwise to follow the contour of the ditch. The duct should preferably be non-metallic as illustrated, so as to be permanent. The circular woven foundation provides resistance to collapse under pressure by reason of the spiralled element or warp, while permitting a certain flexibility lengthwise. A number of variations in the material and design of the duct may be made to secure the qualities of moisture-resistance, transverse stiffness and lengthwise flexibility.

Cable of this character is generally made in lengths of 1000 to 2000 feet. It would entail practical difficulties to insert the conductor into a finished duct of such length. But the insulated conductor may be introduced into the duct in the process of weaving the latter (or the foundation of the duct if the latter is of multiple-layer design) as above explained.

What I claim is:

1. A unitary article of manufacture for installation underground comprising in combination a conductor with an insulating covering attached thereto and a duct of non-conducting material which is by itself stiff enough to be self-supporting under external pressure when laid underground and is waterproof and flexible enough lengthwise to follow the contour of the ground, the conductor and the duct being assembled in fixed relation to each other before use and the insulated conductor being loosely encased in the duct and adapted to be pulled out of the duct after installation.

2. A unitary article of manufacture for installation underground comprising in combination a conductor with an insulating covering attached thereto and a duct of non-conducting material which is by itself stiff enough to be self-supporting under external pressure when laid underground and is waterproof and flexible enough lengthwise to follow the contour of the ground, the conductor and the duct being assembled in fixed relation to each other before use and the insulated conductor being loosely encased in the duct and adapted to be pulled out of the duct after installation, said duct consisting of a woven tube surrounded by a serving of cord-like material.

3. A unitary article of manufacture for installation underground comprising in combination a conductor with an insulating covering attached thereto and a duct of non-conducting material which is by itself stiff enough to be self-supporting under external pressure when laid underground and is waterproof and flexible enough lengthwise to follow the contour of the ground, the conductor and the duct being assembled in fixed relation to each other before use and the insulated conductor being loosely encased in the duct, and adapted to be pulled out of the duct after installation, said duct consisting of an asphalt-treated woven tube surrounded by a serving of asphalt-treated twine.

4. A unitary article of manufacture for installation underground comprising in combination a conductor with an insulating covering attached thereto and a duct of non-conducting material which is by itself stiff enough to be self-supporting under external pressure when laid underground and is waterproof and flexible enough lengthwise to follow the contour of the ground, the conductor and the duct being assembled in fixed relation to each other before use and the insulated conductor being loosely encased in the duct, and adapted to be pulled out of the duct after installation, said duct consisting of a woven tube surrounded by rubber material and by a serving of cord-like material.

5. A unitary article of manufacture for installation underground comprising in combination a conductor with an insulating covering attached thereto and a duct of non-conducting material which is by itself stiff enough to be self-supporting under external pressure when laid underground and is waterproof and flexible enough lengthwise to follow the contour of the ground, the conductor and the duct being assembled in fixed relation to each other before use and the insulated conductor being loosely encased in the duct, and adapted to be pulled out of the duct after installation, said duct consisting of a woven tube surrounded in succession by a rubber material, a spiral tape and a serving of cord-like material.

6. A unitary article of manufacture for installation underground comprising in combination a conductor with an insulating covering attached thereto and a duct of non-conducting material which is by itself stiff enough to be self-supporting under external pressure when laid underground and is waterproof and flexible enough lengthwise to follow the contour of the ground, the conductor and the duct being assembled in fixed relation to each other before use and the insulated conductor being loosely encased in the duct, and adapted to be pulled out of the duct after installation, said duct consisting of a woven tube lined with rubber material and surrounded in succession by rubber material, a spiral tape and a serving of cord-like material.

7. A unitary article of manufacture for installation underground comprising in combination a conductor with an insulating covering attached thereto and a duct of non-conducting material which is by itself stiff enough to be self-supporting under external pressure when underground and is waterproof and flexible enough lengthwise to follow the contour of the ground, the duct with the conductor within it being in a coil by which they are held in fixed relation during manufacture and transportation and the insulated conductor being loosely encased in the duct and adapted to be pulled out of the duct after installation in approximately straight sections underground.

8. A unitary article of manufacture for installation underground comprising in combination a conductor with an insulating covering attached thereto and a non-conducting duct which is by itself stiff enough laterally to be self-supporting under external pressure when laid underground and is waterproof and flexible enough lengthwise to follow the contour of the ground, the conductor and the duct being assembled in fixed relation to each other as manufactured and the insulated conductor being loosely encased in the duct and adapted to be pulled out of the duct after installation, the duct constituting substantially the sole waterproofing and stiffening element of the combination.

9. The article of claim 8, the conductor being directly covered with only a rubber coating.

10. A duct for underground conductors to be buried directly in the earth, being larger than the corresponding conductor so as to encase the latter loosely and permit its withdrawal, said duct being resistant to penetration by water, having lateral stiffness sufficient to prevent collapse under the external pressures encountered in such installations and being flexible enough lengthwise to follow the contour of the ground.

11. The duct of claim 10, being made of vegetable material.

12. The duct of claim 10 in combination with an insulated conductor encased loosely therein in the process of manufacture.

13. The duct of claim 10, in combination with an insulated conductor encased loosely therein, the duct being woven with a spiral warp around the insulated conductor so that the combination is a unitary article of manufacture.

ANDERSON B. SMEDLEY.